Patented June 21, 1949

UNITED STATES PATENT OFFICE 2,473,735

MANUFACTURE OF COMPLEX ORGANIC ANTIMONY COMPOUNDS

William Solomon, London, England, assignor to Burroughs Wellcome & Co. (U. S. A.) Inc., New York, N. Y., a corporation of New York No Drawing. Application December 5, 1946, Serial No. 714,143. In Great Britain March 24, 1942

Section 1, Public Law 690, August 8, 1946
Patent expires March 24, 1962

4 Claims. (Cl. 260—446)

This invention relates to improvements in the manufacture of complex quinquevalent antimony derivatives of the alkali metal or alkaline earth metal salts of hydroxy-carboxylic acids. Such compounds are known per se but the object of the invention is to provide a new process for their manufacture which shall be simple, speedy, economical and convenient, and which shall avoid certain difficulties experienced with existing methods of manufacture, particularly the great difficulty in filtering certain of the solutions and suspensions which are produced during the processes at present employed.

The present invention comprises a process for the manufacture of organic derivatives of quinquevalent antimony consisting in reacting together in approximately molecular proportion of the cold a pentahalide of antimony or an alcoholate thereof and an aqueous solution of an aliphatic or hydro-aromatic hydroxy-carboxylic acid, followed by heating to complete the reaction, neutralisation to yield an alkali metal or alkaline earth metal salt of a reaction product of the antimony pentahalide with the hydroxy-carboxylic acid, and separation of the said salt.

The preferred process according to the invention comprises reacting together in the manner aforesaid antimony pentachloride or its methyl alcoholate and a hydroxy aliphatic or hydro-aromatic carboxylic acid, the neutralisation being effected by a sodium alkali.

Conveniently the separation of the salt may be effected by precipitating it from the solution in which it is prepared by pouring the said solution into methyl alcohol.

The term "alkali metal" as employed herein includes ammonium.

According to a modification of the process as above described instead of adding the antimony pentahalide to the hydroxy-carboxylic acid, the pentahalide can be reacted with an alkali metal or alkaline earth metal salt of the acid.

The complex antimony salts which can be prepared in accordance with this invention are infusible, white powders which are of therapeutic value and (in the case at least of the alkali metal salts) readily soluble in water giving neutral, stable, colourless solutions suitable for use by injection.

The invention is illustrated by the following examples.

Example 1

12.2 grammes of antimony pentachloride are slowly introduced into a cold well stirred solution of 8.1 grammes of gluconic acid or gluconic lactone (which yields gluconic acid in solution) in 10 c. c. of water contained within a flask immersed in melting ice. The solution obtained is neutralised with a 25% solution of sodium hydroxide and heated on a water-bath for half an hour. If any acidity develops during such heating the solution is carefully neutralised again. The solution may be heated with charcoal on a water-bath and filtered in order to clarify it. The product may then be precipitated by pouring into 500 c. c. of well stirred methyl alcohol. There are obtained about 18 grammes of a white powder containing when dry 31.0 per cent of antimony. Metallic halides and any other impurities largely remain in the solution.

Example 2

In the preceding example instead of 12.2 grammes of antimony pentachloride is now used a solution of 13.5 grammes of antimony pentachloride methylalcoholate (prepared as described by Williams, Journal of the Chemical Society, 1876, vol. 30, page 465) in 6.5 c. c. of methyl alcohol. As the process of preparation of the alcoholate comprises the formation of this compound in solution in methylalcohol, this solution itself can be employed, without isolation of the alcoholate therefrom. The remainder of the procedure is just as described in Example 1, the same product in similar yield being obtained.

Example 3

12.2 grammes of antimony pentachloride are slowly introduced into a well stirred solution of 6.1 grammes of tartaric acid in 10 c. c. of water in melting ice. The resulting solution is neutralised with 25% sodium hydroxide solution, heated on the water-bath for half an hour, re-neutralised if necessary and precipitated with 500 c. c. of methyl alcohol as before. Yield about 18 grammes of white powder containing when dry 31.8 per cent of antimony.

Example 4

12.2 grammes of antimony pentachloride are slowly introduced into a well stirred solution of 8.6 grammes of citric acid in 10 c. c. of water cooled in melting ice. The solution is then neutralised with 25% sodium hydroxide solution and heated on the water-bath for half an hour. After re-neutralisation if necessary any insoluble solid material which may be deposited during this time is filtered off, and the soluble product then precipitated with 500 c. c. of methyl alcohol as before. Yield about 18 grammes of white powder containing, when dry, 25.6 per cent of antimony.

Example 5

6.1 grammes of antimony pentachloride are slowly introduced with constant stirring into an ice cooled solution of 3.8 grammes of quinic acid in 5 c. c. of water. After neutralising and heating in the usual manner, the product is isolated as before. It contains 34.8 per cent of antimony. Yield about 7 grammes.

Example 6

12.2 grammes of antimony pentachloride are slowly introduced with constant stirring into a solution of 5.5 grammes of malic acid in 10 c. c. of water cooled by immersion in melting ice, and the solution is neutralised with 25% sodium hydroxide solution. After the previously described process of heating and re-neutralisation followed by precipitation with 500 c. c. of methyl alcohol, there is obtained a yield of 13 grammes of a white powder containing when dry 38.3 per cent. of antimony.

Example 7

4.4 grammes of calcium gluconate are dissolved in boiling water, and to this solution, cooled by immersion in melting ice, are added 5.75 grammes of antimony pentachloride. The clear solution so obtained is neutralised by the addition of slaked lime heated on a water-bath for half an hour, and re-neutralised if necessary by means of lime-water. When the volume of lime-water so used is considered it may be advantageous to concentrate the clear solution before isolating the product by precipitation with methyl alcohol as before. The yield is about 7 grammes of a white powder, containing when dry 30.5 per cent of antimony and consisting of the very sparingly soluble calcium salt of a complex quinquevalent antimony derivative of gluconic acid.

The new process does not involve the formation of insoluble by-products at any stage. There is therefore no absolute necessity for filtration operations, but where these are considered desirable (for clarifying the solution from particles of impurities) they may be readily carried out in the ordinary manner. This is a most beneficial technical result, for the processes hitherto employed for producing the therapeutic compounds in question have involved the production of slimy, flocculent precipitates which could only be separated by filtration or centrifuging with the greatest difficulty. Thus the new process is not only simpler but obviates a considerable loss of reagents and waste of time previously involved. Moreover it can be carried into effect without special apparatus.

What I claim is:

1. A process for the manufacture of organic derivatives of quinquevalent antimony consisting in reacting together in approximately molecular proportion in the cold a compound selected from the group of compounds consisting of pentahalides of antimony and alcoholates of pentahalides of antimony and an aqueous solution of a compound selected from the group consisting of aliphatic hydroxycarboxylic acids, hydro-aromatic hydroxycarboxylic acids and alkali and alkaline earth metal salts of said acids followed by heating to complete the reaction, neutralisation with an alkali selected from the group consisting of alkali metal alkalies and alkaline earth metal alkalies to yield a salt of a reaction product of the antimony pentahalide with the hydroxy-carboxylic acid, and separation of the said salt.

2. The process claimed in claim 1 in which the separation of the salt is effected by precipitating it from the solution in which it is prepared by pouring the said solution into methyl alcohol.

3. The process claimed in claim 1 characterised in that antimony pentachloride is employed and in that the neutralisation is effected by a sodium alkali.

4. The process claimed in claim 1 characterised in that the methyl alcoholate of antimony pentachloride is employed and in that the neutralisation is effected by a sodium alkali.

WILLIAM SOLOMON.

REFERENCES CITED

The following references are of record in the file of this patent:

UNITED STATES PATENTS

| Number | Name | Date |
| --- | --- | --- |
| 1,964,696 | Traube et al. | June 26, 1934 |
| 1,975,803 | Schmidt | Oct. 9, 1934 |
| 2,066,742 | Schmidt | Jan. 5, 1937 |

FOREIGN PATENTS

| Number | Country | Date |
| --- | --- | --- |
| 247,986 | Great Britain | July 22, 1926 |